United States Patent
Peevers et al.

(10) Patent No.: US 6,856,329 B1
(45) Date of Patent: Feb. 15, 2005

(54) AUTOMATED ACQUISITION OF VIDEO TEXTURES ACQUIRED FROM A DIGITAL CAMERA FOR MAPPING TO AUDIO-DRIVEN DEFORMABLE OBJECTS

(75) Inventors: Alan Peevers, Santa Cruz, CA (US); Alan Seefeldt, Somerville, MA (US)

(73) Assignee: Creative Technology Ltd., Singapore (SG)

( * ) Notice: Subject to any disclaimer, the term of this patent is extended or adjusted under 35 U.S.C. 154(b) by 349 days.

(21) Appl. No.: 09/666,650

(22) Filed: Sep. 20, 2000

Related U.S. Application Data

(60) Provisional application No. 60/165,097, filed on Nov. 12, 1999.

(51) Int. Cl.[7] .................................................. G09G 5/00
(52) U.S. Cl. ...................... 345/722; 345/582; 345/726; 345/949; 84/464 R
(58) Field of Search ................................ 345/632, 633, 345/582, 723, 724, 726, 721, 949; 84/464 R; 434/307 A

(56) References Cited

U.S. PATENT DOCUMENTS

| | | | | |
|---|---|---|---|---|
| 5,696,892 A | * | 12/1997 | Redmann et al. | 345/582 |
| 5,880,788 A | * | 3/1999 | Bregler | 348/515 |
| 5,982,378 A | * | 11/1999 | Kato | 345/582 |
| 5,986,675 A | * | 11/1999 | Anderson et al. | 345/473 |
| 6,001,013 A | * | 12/1999 | Ota | 463/7 |
| 6,177,623 B1 | * | 1/2001 | Ooseki | 84/477 R |
| 6,204,851 B1 | * | 3/2001 | Netschke et al. | 345/419 |
| 6,285,381 B1 | * | 9/2001 | Sawano et al. | 345/726 |
| 6,400,374 B2 | * | 6/2002 | Lanier | 345/630 |
| 6,456,287 B1 | * | 9/2002 | Kamen et al. | 345/427 |
| 6,463,176 B1 | * | 10/2002 | Matsugu et al. | 382/195 |

OTHER PUBLICATIONS

Sahlin, Doug. "3D Mapping with UView 2.1", Apr. 1, 2000, 3D Gate, http://www.3dgate.com/tools/000501/0501uview.html.*

* cited by examiner

*Primary Examiner*—Shawn M Becker
(74) *Attorney, Agent, or Firm*—Blakely, Sokoloff, Taylor & Zafman LLP

(57) ABSTRACT

A technique for enhancing an audio-driven computer generated animation includes the step of mapping a video clip generated by a digital camera to an object displayed in the animation. Additionally, the object or the video clip can be deformed when selected events are detected during playback of the video clip.

6 Claims, 2 Drawing Sheets

AUTOMATED ACQUISITION OF VIDEO TEXTURES ACQUIRED FROM A DIGITAL CAMERA FOR MAPPING TO AUDIO-DRIVEN DEFORMABLE OBJECTS

CROSS-REFERENCES TO RELATED APPLICATIONS

This application claims priority from provisional Application No. 60/165,097, filed Nov. 12, 1999, the disclosure of which is incorporated herein by reference.

BACKGROUND OF THE INVENTION

The use of computers to play music has created a great interest in techniques of providing a visual accompaniment to the music, known as "eye candy." This interest has been accelerated by the internet and the availability of MP3 audio files which can be downloaded and played on MP3 players, such as WinAmp, Sonique, etc., which are also downloaded. Many of these players are configured to run plug-in visualization programs. Some of these players such as LAVA (Live Audio-Visual Animation), created by the assignee of the present invention, respond in real time to events based on characteristics of the music being played, e.g., transients (such as beats) or sounds in a selected frequency band (such as a high note played by flute).

These real time video musical accompaniments are generally presented in a hard-wired format with limited control by the viewer. The scenes are usually designed by professional programmers and downloaded in compiled format to the users. Typically an interface is provided with minimal controls such as switching between fixed scenes, varying preset camera angles, and toggling between preset object or scene attributes.

Typically, the art in the scene consists of shapes and mapped textures which are stored in the memory of the computer. A visualization product disclosed in a co-pending application entitled DATA STRUCTURE AND CONTROL INTERFACE FOR AN EVENT DRIVEN VISUAL PRESENTATION, filed Nov. 12, 1999 (application Ser. No. 60/165,059, which is hereby incorporated by reference for all purposes) describes a product allowing editing by a viewer to facilitate substitution of existing scene objects and textures with new objects and textures which may be downloaded from the internet.

Often the original scene is entertaining and interesting but the user has ideas on how to customize or vary the scene. Accordingly, developers of event driven music visualizations are continuing to refine their products.

SUMMARY OF THE INVENTION

According to one aspect of the present invention, a video signal from an external source is texture-mapped onto an object displayed in computer generated animation. The video signal may be generated in real time by a video camera coupled to the computer. Thus, for example, a user may map a video image of his/her face onto an object in the animation.

According to another aspect of the invention, a template is used to map features of the face onto corresponding regions of an object in the animation. This mapping facilitates altering the appearance of selected features of the texture-mapped video image of the face.

According to another aspect of the invention, the appearance of the texture-mapped video is altered when selected events are detected. These events may detected in an audio signal being animated or in the video signal being texture-mapped.

According to another aspect of the invention, the event detected in the video signal may be the crossing over a threshold of the value of a parameter, for example, the luminosity, of the video signal.

According to another aspect of the invention, the video signal alterations include altering the luminosity of the entire signal or regions of the signal and altering the palette to change the appearance of the video signal.

According to another aspect of the invention, regions of the mapped video image can be elevated or depressed when a selected event is detected.

Additional features and advantages will be apparent in view of the following detailed description and appended drawings.

DESCRIPTION OF THE SPECIFIC EMBODIMENTS

A preferred embodiment of the present invention will be described with reference to the LAVA audio-driven visualization generator manufactured by the assignee of the present application. However, the invention is not limited to LAVA but has broad applicability for improving event driven visualization in many contexts.

Figure 1:
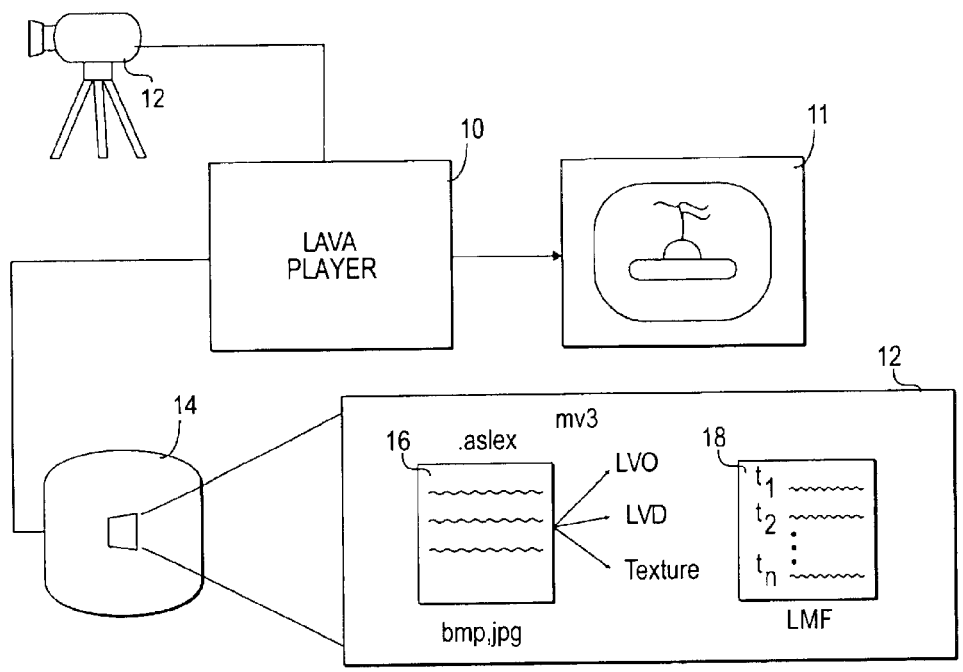
FIG. 1 is a block diagram of a preferred embodiment of the present invention.

FIG. 1 is a block diagram overview of a LAVA player utilizing an MV3 format. The LAVA player 10 is a compiled executable application which reads the MV3 file from memory. The MV3 file is described in the above-referenced patent application and is read by the LAVA player 10 to obtain parameters and other information needed to initialize, render, and animate a LAVA visualization 11.

In FIG. 1 a video camera 12 is coupled to the LAVA player 10. This camera generates a video or a single frame (still image) which can be mapped onto an object by the user.

The LAVA player may utilize a MV3 format. The LAVA player 10 is a compiled executable application which reads the MV3 file 12 from memory 14, e.g., a hard disk. The MV3 file 12 may be a cabinet (CAB) file, containing a temporary ASCII configuration file (called a ashex file 16) and all bitmaps in the scene at the time the CAB file was created. The ashex file 16 includes all information required to describe a static scene, including objects (e.g. LAVA object file (LVO)) and their respective positions, a LAVA deformation file (LVD), and a texture file. There is also a LAVA macro file (LMF) 18 which includes time-varying (event) information.

Figure 2:
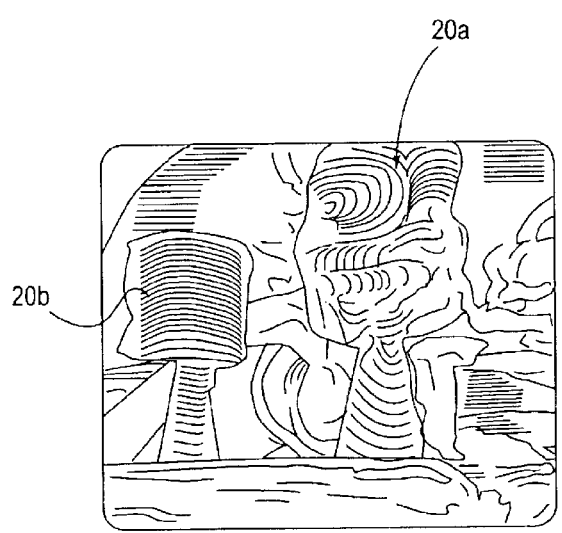
FIG. 2 is a diagram depicting a scene.

FIG. 2 is a depiction of a typical LAVA scene. Several objects are rendered and images (e.g. images 20a and 20b) are mapped as textures on the objects utilizing 3D-graphics techniques well-known in the art. In LAVA the textures can be moved along the surface of an object in response to events in the audio signal being played. One type of deformation is a "crawl" where the texture is displaced on the surface of the object.

In the preferred embodiment, a video or frame (still image) from the digital camera 12 is mapped to an object (see operation 402 in FIG. 4) in real time so that the image recorded by the digital camera is viewed on the object as a video texture. Thus, an image external to the computer will be mapped to an object in the 3D LAVA visualization.

Additional still images, generated by the digital camera, can also be mapped as textures on objects in the LAVA visualization. A special technique can be utilized for mapping a face onto an object. For certain shapes, such as an ellipsoid, the mapping of the face is more realistic if the axis of the face is aligned along the long axis of the ellipsoid. A user interface (UI) displays a template for aligning the face's orientation and scaling to match the target object to provide realistic texture mapping. The template also facilitates mapping deformations to features such as the eyes or nose.

Further, the template facilitates positioning various features of the image (e.g. eyes and mouth) so that they are centered on previously positioned deformations that have been defined on the surface of the target object.

Figure 3:
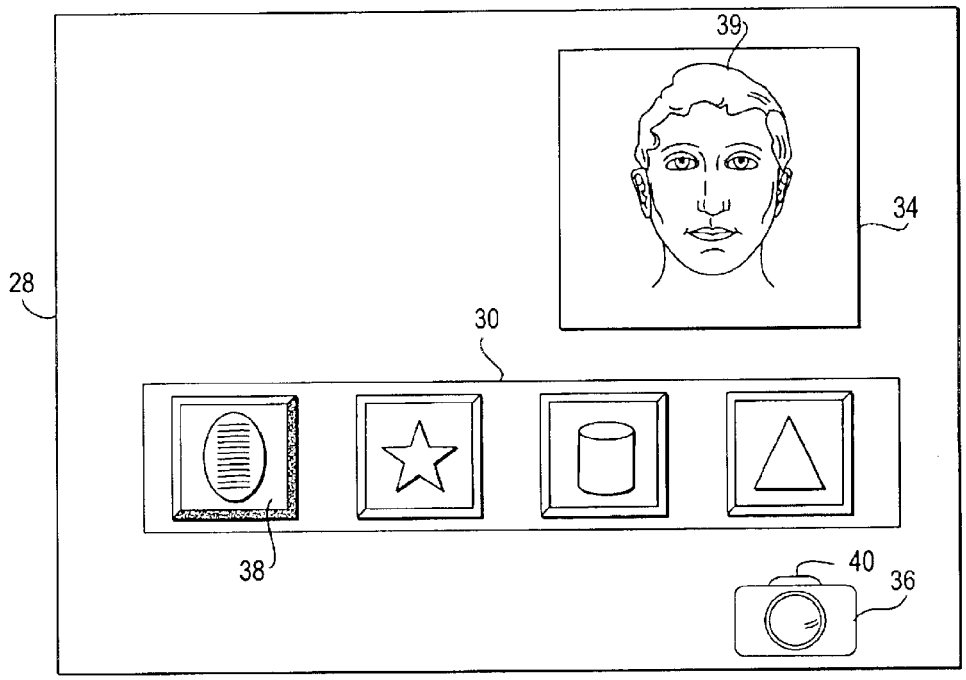
FIG. 3 is a diagram depicting a preferred embodiment of a user interface.

For example, as depicted in FIG. 3, the UI 28 includes an object selection window 30 displaying thumbnails representing objects in a current scene, a texture positioning window 34 and a camera button 36. When a specific object 38 is selected, an alignment template 39 specific for that object is placed in the texture positioning window 34. Once the camera button 36 is pressed a video image from the camera will appear in the texture positioning window 34, with the alignment template 39 displayed as an overlay on top of it. The user will then move the camera's subject (for example, her head, if the camera is pointed at her) so that various features of the video image are coincident with elements of the alignment template 39. In the example of the head, the subject moves her head (or the camera) until the three points in the alignment template 39 corresponding to two eyes and a nose line up with these same features in the video image. Once the desired alignment is achieved, a snapshot button 40 is pressed which then maps the video image to the object 38 with the correct alignment. Deformations defined on object 38 may then alter the eyes and nose specifically, since they are located at positions on the object's surface corresponding to the features in the alignment template 39.

A preferred embodiment utilizes several techniques, singly or in combination, to animate a scene that includes texture-mapped real time video. These techniques include:
1. deforming parts of the surface of the objects onto which selected regions of the video image are texture-mapped by moving the vertices of the corresponding part of the 3D object. For example, if the video image were a face then the selected regions could be the nose and the eye sockets defined relative to the template. The deformation could be defined to elevate the nose and recess the eye sockets. Alternatively, the selected regions could be defined in terms of average luminosity of groups of pixels. The deformation could be defined to elevate regions with a luminescence value higher than a threshold value or to recess areas with a luminescence value less than a threshold value. For example, a bright nose would be projected forward and dark eye sockets would recede into the head. The elevation or depression is accomplished moving the vertices of the 3D image;
2. modifyng texture mapping coordinates to cause the texture-mapped video to crawl and/or twist across the surface of the object. A technique for altering texture mapping coordinates (see operation 406 in FIG. 4) is described in a commonly, assigned co-pending patent application entitled AUDIO DRIVEN TEXTURE AND COLOR DEFORMATIONS OF COMPUTER GENERATED GRAPHICS (filed Jan. 26, 2000, application Ser. No. 09/491,530, which is hereby incorporated by reference for all purposes); and
3. modifying image parameters of parts of the video image (e.g. contrast or hue) or changing the color palette to cause the image to appear black-and-white, show color contours, or appear "psychedelic." Alternatively, parts of the image, e.g., the eyes or nose, defined relative to the template or by other means, could have contrast, luminosity, or color modified.

Figure 4:
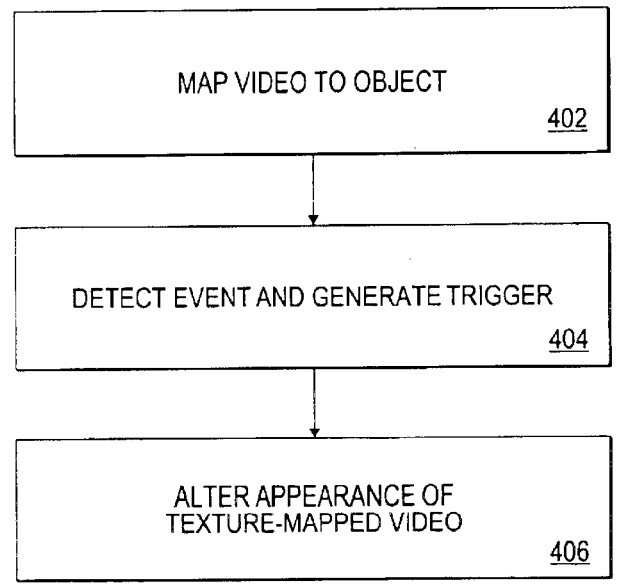
FIG. 4 is a flow chart depicting the steps of deforming a mapped video in response to audio events.

As depicted in FIG. 4, each of the above described deformations or modifications is initiated by a trigger signal generated from a detected event (see operation 404 in FIG. 4). These triggering signals can either be generated by events detected in the audio signal being animated, as disclosed in the commonly assigned, co-pending application entitled AUDIO DRIVEN VISUAL REPRESENTATIONS, (filed Aug. 12, 1999, application Ser. No. 09/373,405, which is hereby incorperated by reference for all purposes) or events detected in the video signal. For example, an event could be defined as detecting a luminescence value above a defined threshold for any in a video frame.

Other types of deformations could be similar to "transitions" used in advertising videos, e.g., morphing a plane image into a page turn or other morphings.

The invention has now been described with reference to the preferred embodiments. Alternatives and substitutions will now be apparent to persons of skill in the art. For example, the video or still frame may not be generated in real time but could be read from a storage medium such as a disk or CD. Accordingly, it is not intended to limit the invention except as provided by the appended claims.

What is claimed is:

1. A method of generating a computer generated animation to provide a visual accompaniment to music, comprising:

displaying an animation scene including a plurality of 3D objects;

displaying an object selection screen for allowing a user to select one object currently displayed in said animation scene as a selected object;

providing a video signal from a source external to the computer;

displaying a video selection icon;

displaying a face template having facial feature indications and oriented and scaled to match a target object included in the animation, with the feature indications corresponding to similarly oriented regions on the target object;

orienting a video signal image so that an image of a face is aligned with the face template and features of the face are overlaid by feature indications of the templates;

mapping features of the face aligned to feature indications of the template to corresponding regions of the target object; and deforming part of a surface of the target object onto which the features of the face are mapped, and wherein if the user clicks the video selection icon texture mapping the video signal onto the selected object in the animation scene so that a texture-mapped video signal is displayed on the surface of the selected object;

altering an appearance of the texture-mapped video signal displayed on the surface of the selected object based on music events;

detecting a selected event in the video signal being texture-mapped; wherein said act of detecting comprises detecting when a luminescence parameter of the video signal passes a threshold; and altering the appearance of the texture-mapped video when the selected event is detected.

2. The method of claim 1 where said act of providing the video signal comprises:

using a video camera to generate the video signal in real time.

3. The method of claim 1 where said act of altering the texture-mapped video comprises:

altering an image parameter of the texture-mapped video.

4. The method of claim 1 where said altering the texture-mapped video comprises:

altering a display palette for the texture-mapped video to cause the texture-mapped video to appear blocky.

5. The method of claim 1 where said act of altering comprises:

altering the luminosity of selected areas of the texture-mapped video.

6. The method of claim 1 where said altering further comprises:

elevating a first region of the texture-mapped video when a selected event is detected; and depressing a second region of the texture-mapped video when a selected event is detected.

* * * * *